(12) United States Patent
Beaurepaire et al.

(10) Patent No.: US 9,063,582 B2
(45) Date of Patent: Jun. 23, 2015

(54) METHODS, APPARATUSES, AND COMPUTER PROGRAM PRODUCTS FOR RETRIEVING VIEWS EXTENDING A USER'S LINE OF SIGHT

(71) Applicant: Nokia Technologies OY, Espoo (FI)

(72) Inventors: Jerome Beaurepaire, Berlin (DE); Maguy Jamain, Berlin (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/729,177

(22) Filed: Dec. 28, 2012

(65) Prior Publication Data

US 2014/0188387 A1   Jul. 3, 2014

(51) Int. Cl.
*G08G 1/123* (2006.01)
*G06F 3/03* (2006.01)
*G01C 21/36* (2006.01)
*G06F 3/0481* (2013.01)

(52) U.S. Cl.
CPC .............. *G06F 3/03* (2013.01); *G01C 21/3647* (2013.01); *G06F 3/04815* (2013.01); *G01C 21/3638* (2013.01); *G01C 21/3679* (2013.01)

(58) Field of Classification Search
CPC ..... G06F 9/4401; G06F 9/4405; A63F 13/00; A63F 13/005; A63F 2300/203
USPC ................. 701/201, 208, 211, 470, 533, 538; 396/429, 419, 379, 376, 2; 345/8, 156, 345/158, 660, 418, 634; 455/456.1, 456.3; 370/352; 235/375; 340/669; 714/46; 42/111; 348/552; 398/126; 382/131; 378/901; 172/1, 2
See application file for complete search history.

(56) References Cited

U.S. PATENT DOCUMENTS

| | | | | |
|---|---|---|---|---|
| 6,526,352 B1 * | 2/2003 | Breed et al. | .................... | 701/470 |
| 6,563,529 B1 | 5/2003 | Jongerius | | |
| 8,325,712 B2 * | 12/2012 | Buckley et al. | ................ | 370/352 |
| 8,489,948 B2 * | 7/2013 | Hannuksela et al. | ......... | 714/746 |
| 8,519,858 B2 * | 8/2013 | Tysowski et al. | ............. | 340/669 |
| 8,700,303 B2 * | 4/2014 | Uusitalo | ....................... | 701/300 |

(Continued)

FOREIGN PATENT DOCUMENTS

| | | |
|---|---|---|
| EP | 2 270 767 A1 | 1/2011 |
| JP | 2008-241875 | 10/2008 |
| WO | WO 2014/102455 A2 | 7/2014 |

OTHER PUBLICATIONS

Google Maps—Wikipedia, the free encyclopedia; Downloaded at http://en.wikipedia.org/wiki/Google_maps on Jan. 24, 2013; 26 pages.

(Continued)

*Primary Examiner* — McDieunel Marc
(74) *Attorney, Agent, or Firm* — Alston & Bird LLP

(57) ABSTRACT

Methods, apparatuses, and computer program products are herein provided for retrieving views extending a user's line of sight. A method includes determining a line of sight based at least in part on a user's location and orientation. The line of sight defines a first portion of a map representing information that is within the user's sight and a second portion of the map representing information that is out of the user's sight. The method further includes determining at least one image associated with at least one location within the second portion of the map. The method further includes causing the image associated with the at least one location to be presented to the user. Corresponding apparatuses and computer program products are also provided.

18 Claims, 14 Drawing Sheets

(56) References Cited

U.S. PATENT DOCUMENTS

| | | |
|---|---|---|
| 2008/0066000 A1 | 3/2008 | Ofek et al. |
| 2009/0063047 A1* | 3/2009 | Ono .............................. 701/211 |
| 2010/0125407 A1* | 5/2010 | Cho et al. ...................... 701/201 |
| 2011/0093194 A1* | 4/2011 | Paik et al. ..................... 701/208 |
| 2011/0190008 A1* | 8/2011 | Eronen et al. .............. 455/456.3 |
| 2011/0246845 A1* | 10/2011 | Hannuksela et al. ......... 714/746 |
| 2011/0283223 A1 | 11/2011 | Vaittinen et al. |
| 2011/0287811 A1 | 11/2011 | Mattila et al. |
| 2011/0320116 A1* | 12/2011 | DeMaio et al. ............... 701/201 |
| 2012/0168497 A1* | 7/2012 | Yach .............................. 235/375 |
| 2012/0203460 A1* | 8/2012 | Cho et al. ...................... 701/538 |
| 2013/0184007 A1* | 7/2013 | Hategan et al. ............ 455/456.1 |

OTHER PUBLICATIONS

Google Street View—Wikipedia, the free encyclopedia; Downloaded at http://en.wikipedia.org/wiki/Google_street_view on Jan. 24, 2013; 17 pages.

International Search Report for Application No. PCT/FI2013/051191 dated Jul. 16, 2014.

\* cited by examiner

METHODS, APPARATUSES, AND COMPUTER PROGRAM PRODUCTS FOR RETRIEVING VIEWS EXTENDING A USER'S LINE OF SIGHT

TECHNOLOGICAL FIELD

An example embodiment of the present invention relates generally to user interface technology and, more particularly, relates to methods, apparatuses, and computer program products for retrieving views extending a user's line of sight.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

With increased computing function and decreased form factor, mobile computing devices may provide many different useful functions. For example, mobile computing devices may be useful for navigation purposes. Additionally, some mobile computing devices may present images to the user.

In some cases, a user may wish to view possible destinations or locations without having to actually travel to those destinations or locations. As such, some embodiments of the present invention seek to provide retrieval of images associated with locations that are currently out of the user's sight. Additionally, in some embodiments, a user-friendly interface is contemplated that enables the user to quickly view images associated with the location. In such a manner, the user may view the image and determine if they wish to travel to that location.

Thus, some example embodiments of the present invention provide for retrieving views extending a user's line of sight. In one example embodiment, a method includes determining a line of sight based at least in part on a user's location and orientation. The line of sight defines a first portion of a map representing information that is within the user's sight and a second portion of the map representing information that is out of the user's sight. The method further includes determining at least one image associated with at least one location within the second portion of the map. In some embodiments, the method further includes causing the image associated with the location to be presented to the user.

In some embodiments, the method further includes receiving user input directed to the at least one location within the second portion of the map. Additionally, the method further includes, in response to receiving the user input, causing the image associated with the location to be presented to the user.

Additionally, in some embodiments, the method comprises receiving user input directed to the at least one location within the second portion of the map by receiving user input comprising a slide gesture.

In some embodiments, the method further includes causing presentation of the line of sight on the map. Additionally, in some embodiments, the method further includes receiving user input directed to the at least one location within the second portion of the map. Additionally, the method may further include, in response to receiving the user input, causing the image associated with the location to be presented to the user. Additionally, in some embodiments, the method may further include causing presentation of an icon relative to the location within the second portion of the map. Additionally, in some embodiments, the method may further include receiving user input directed to the icon and, in response to receiving the user input, causing the image associated with the location to be presented to the user.

In some embodiments, the method may further include causing presentation of a slide relative to the first portion of the map. Additionally, a portion of the slide may be associated with the at least one location within the second portion of the map. In some embodiments, the method may further include receiving user input directed to at least a portion of the slide and, in response to receiving the user input, causing the image associated with the location to be presented to the user.

In some embodiments, the method may further include determining the line of sight by determining the line of sight based at least in part on an object within the user's sight.

In some embodiments, the method may further include causing presentation of a route on the map. At least a portion of the route may be associated with the location within the second portion of the map. Additionally, the method may include causing presentation of an icon on the portion of the route associated with the location. Moreover, in some embodiments, the method may include receiving user input directed to the icon and, in response to receiving the user input, causing the image associated with the location to be presented to the user.

In some embodiments, the icon may be configured to slide along the route. Additionally, the method may include receiving user input by receiving user input defining a slide gesture with the icon extending from the portion of the route.

In another example embodiment, an apparatus comprises at least one processor and at least one memory storing computer program code with the at least one memory and stored computer program code being configured, with the at least one processor, to cause the apparatus to determine a line of sight based at least in part on a user's location and orientation. The line of sight defines a first portion of a map representing information that is within the user's sight and a second portion of the map representing information that is out of the user's sight. The at least one memory and stored computer program code are configured, with the at least one processor, to further cause the apparatus to determine at least one image associated with at least one location within the second portion of the map. In some embodiments, the at least one memory and stored computer program code are configured, with the at least one processor, to further cause the apparatus to cause the image associated with the location to be presented to the user.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including determining a line of sight based at least in part on a user's location and orientation. The line of sight defines a first portion of a map representing information that is within the user's sight and a second portion of the map representing information that is out of the user's sight. The method further includes determining at least one image associated with at least one location within the second portion of the map. In some embodiments, the method further includes causing the image associated with the location to be presented to the user.

In another example embodiment, an apparatus is provided. The apparatus comprises means for determining a line of sight based at least in part on a user's location and orientation. The line of sight defines a first portion of a map representing information that is within the user's sight and a second portion of the map representing information that is out of the user's sight. The apparatus further comprises means for determining at least one image associated with at least one location within the second portion of the map. In some embodiments, the apparatus further comprises means for causing the image associated with the location to be presented to the user.

BRIEF DESCRIPTION OF THE DRAWINGS

Figure 1:
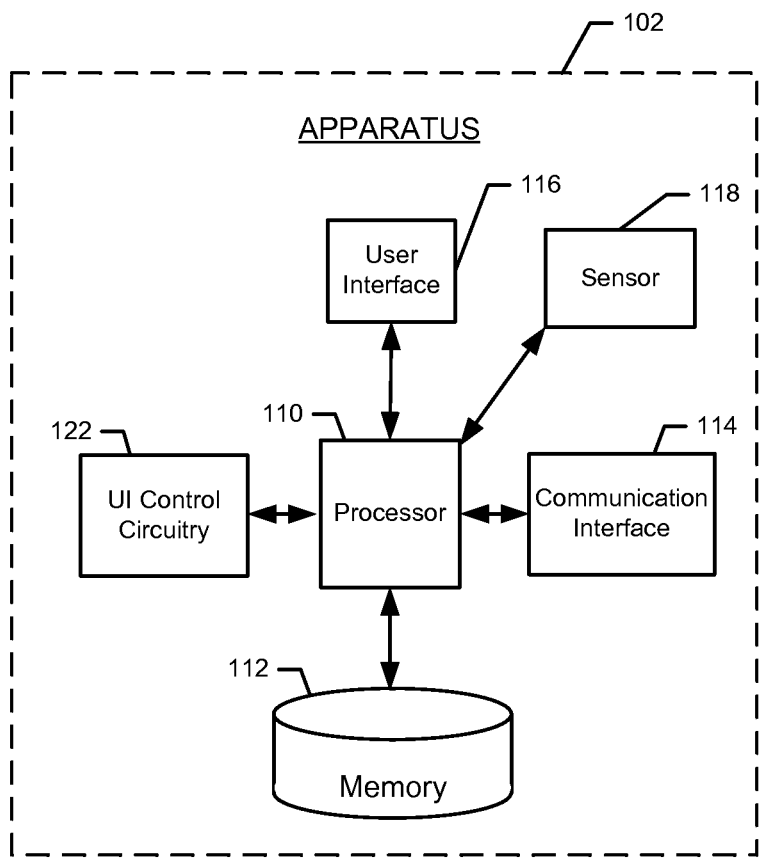
Figure 2:
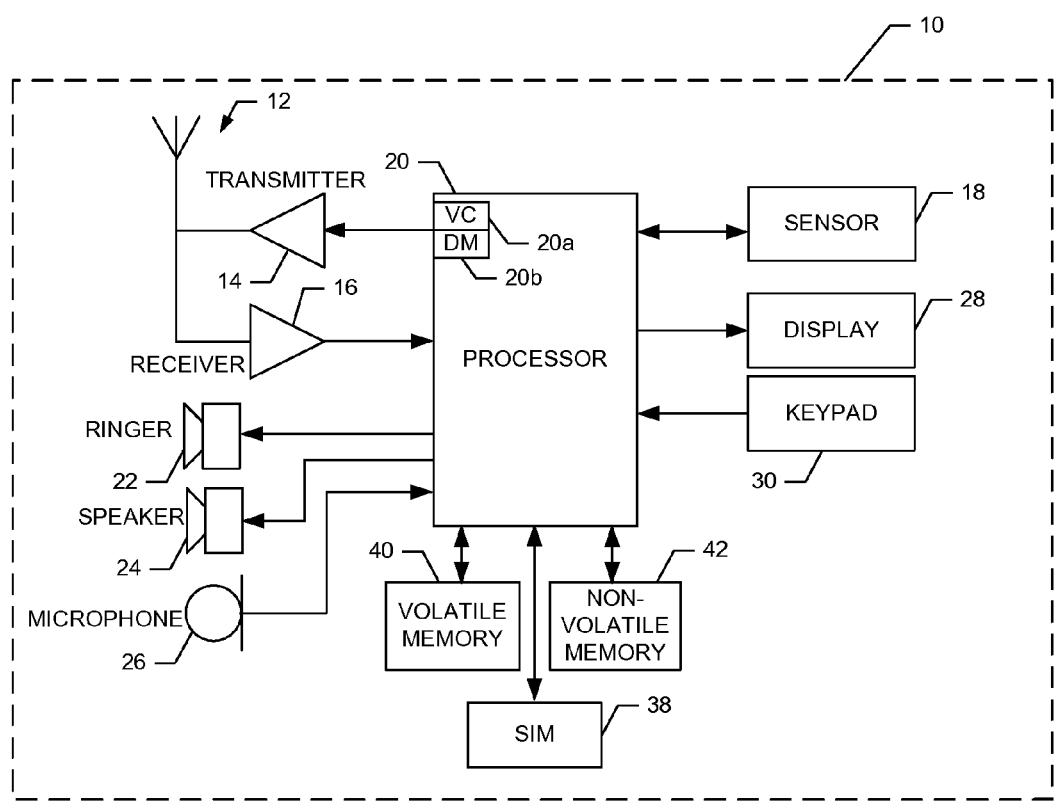
Figure 3:
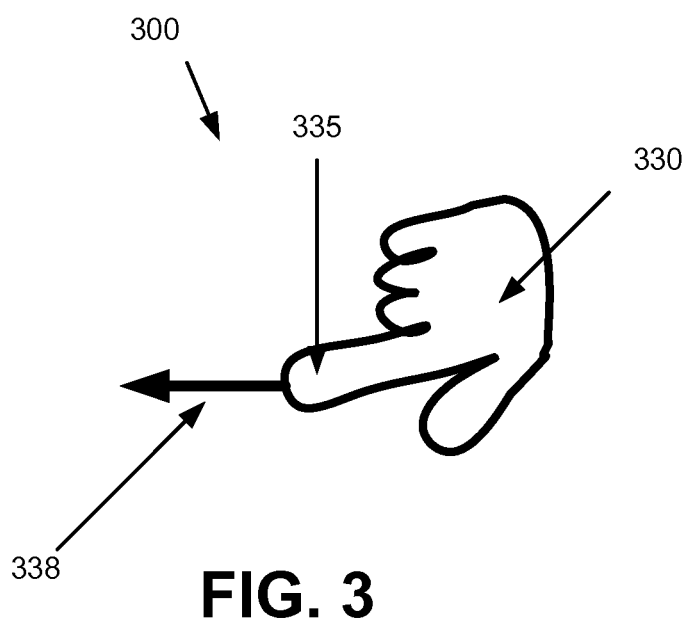
Figure 4:
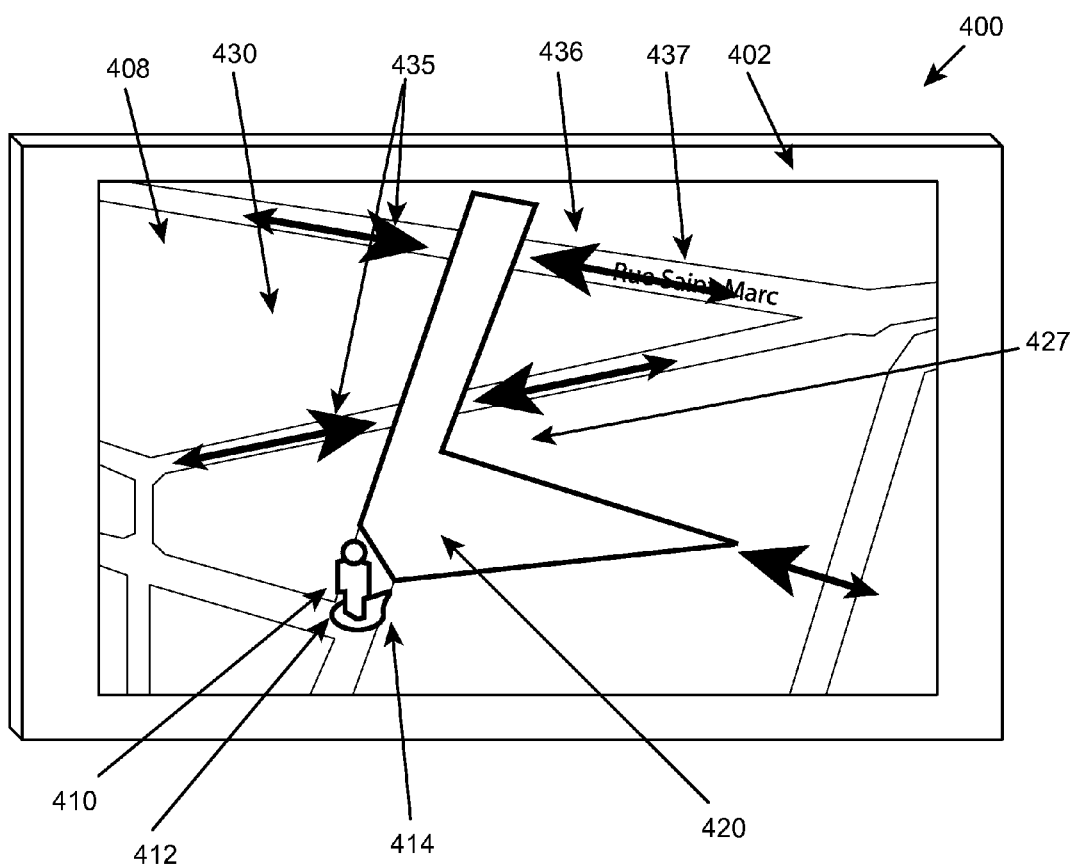
Figure 5:
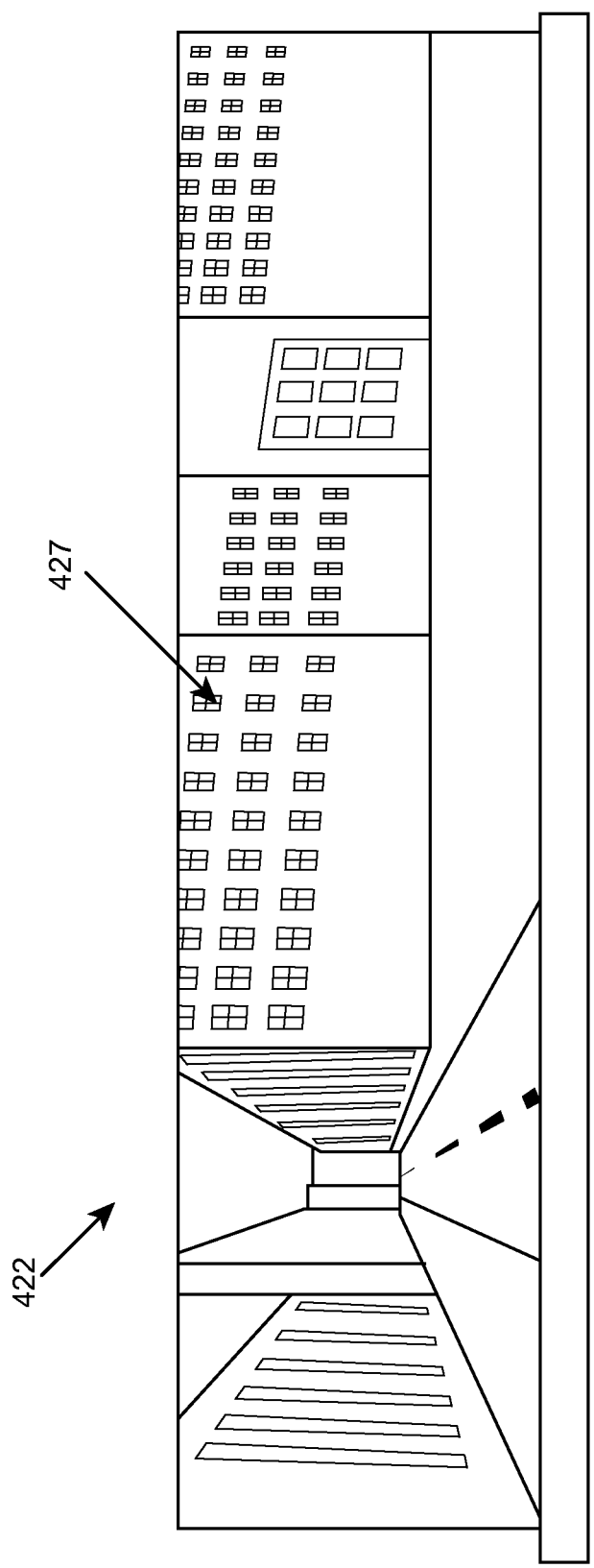
Figure 6:
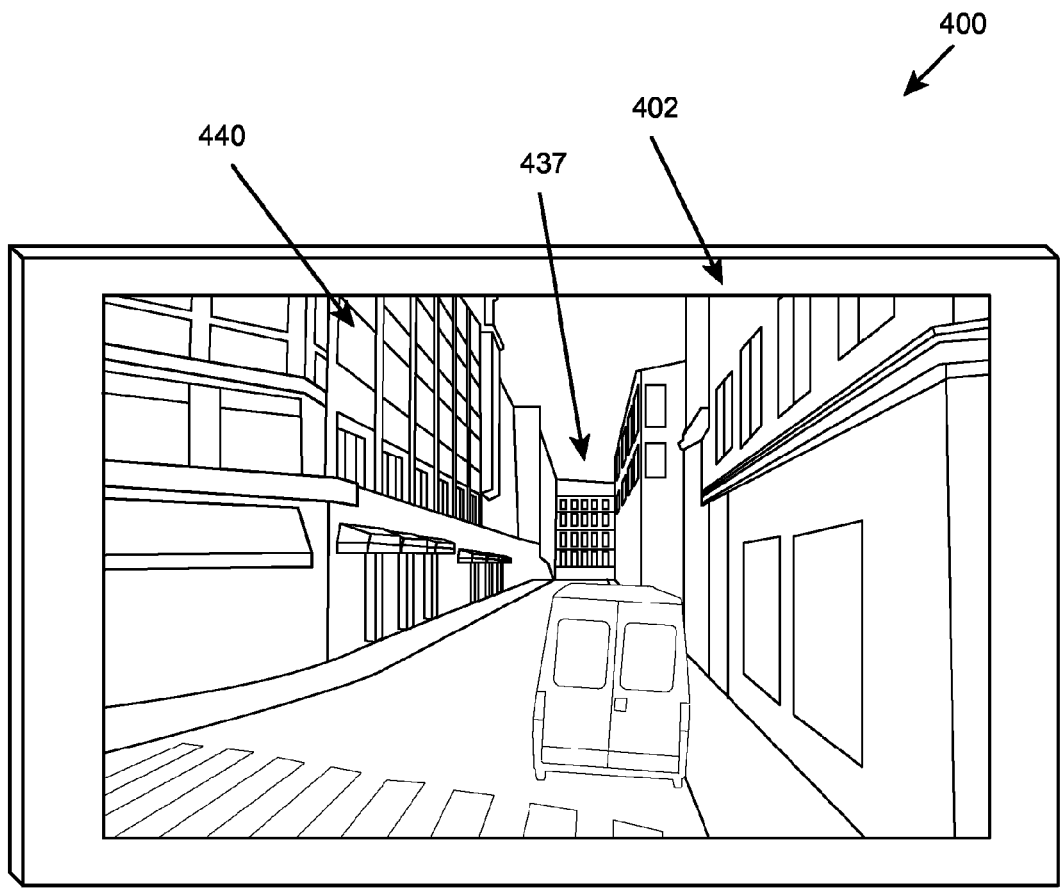
Figure 7:
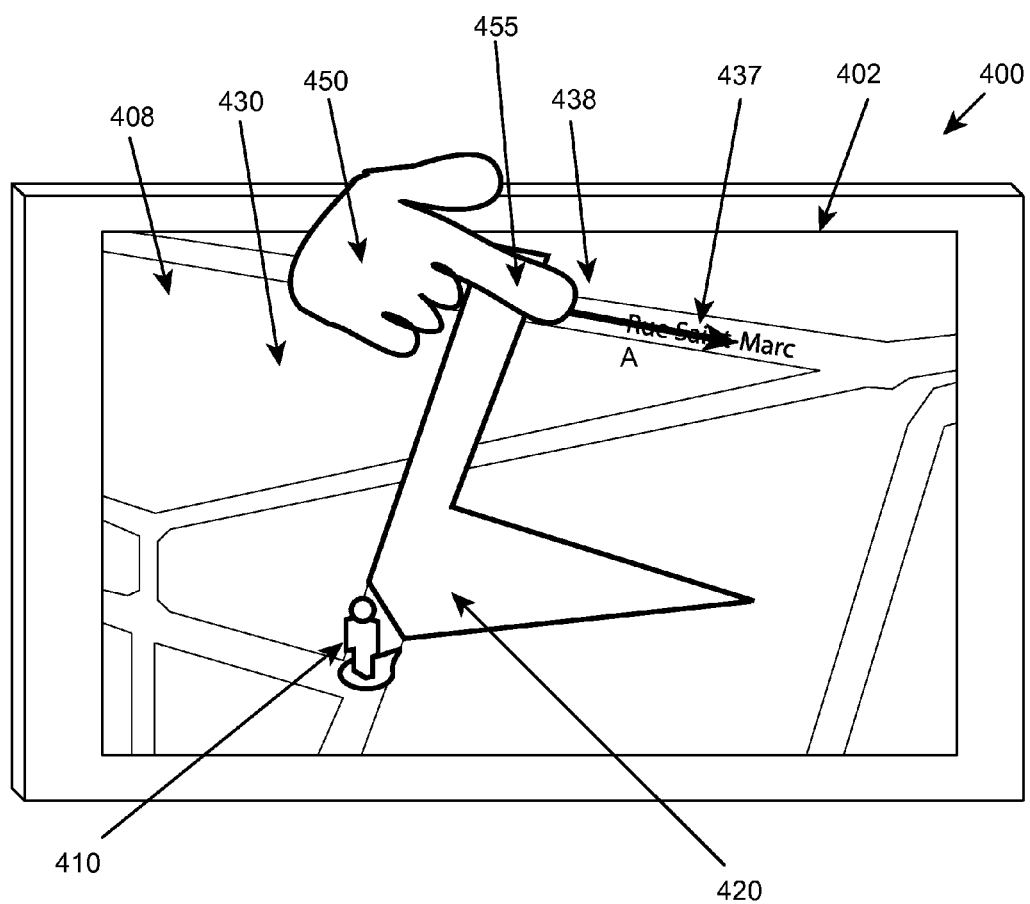
Figure 8:
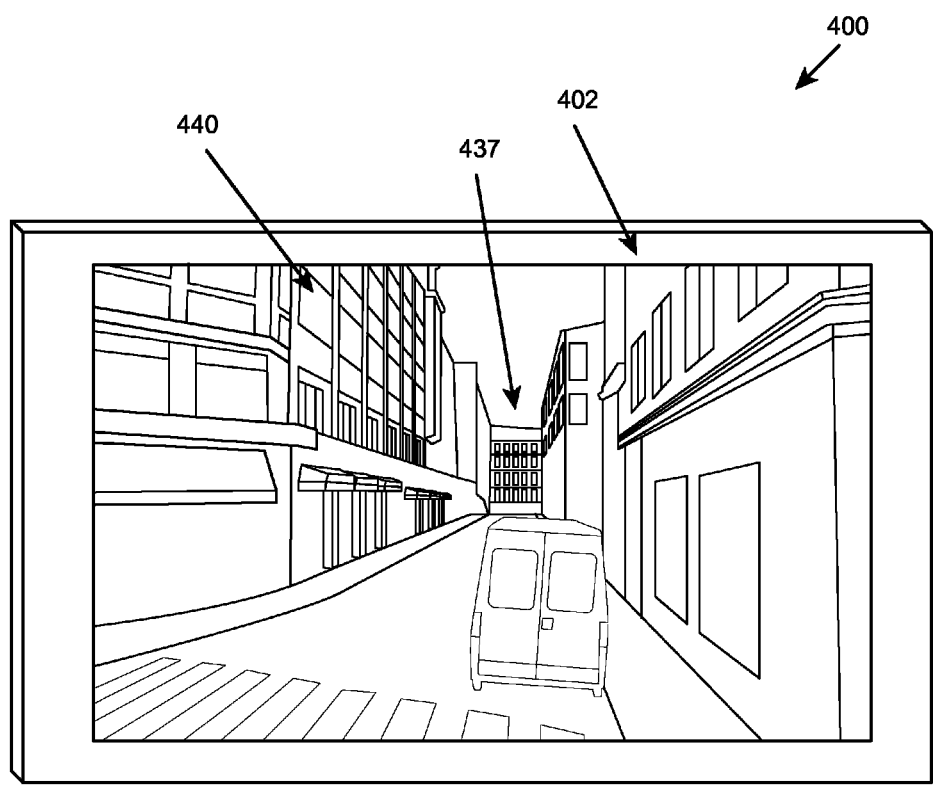
Figure 9:
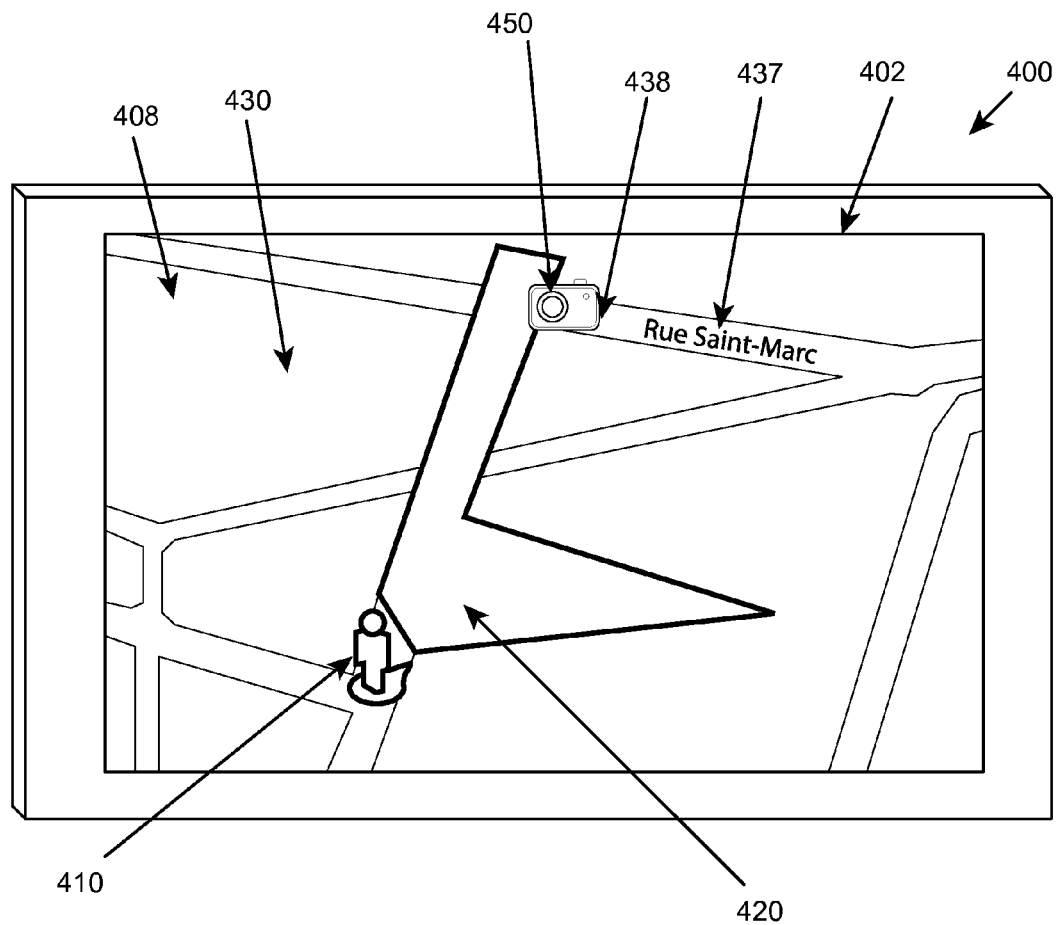
Figure 10:
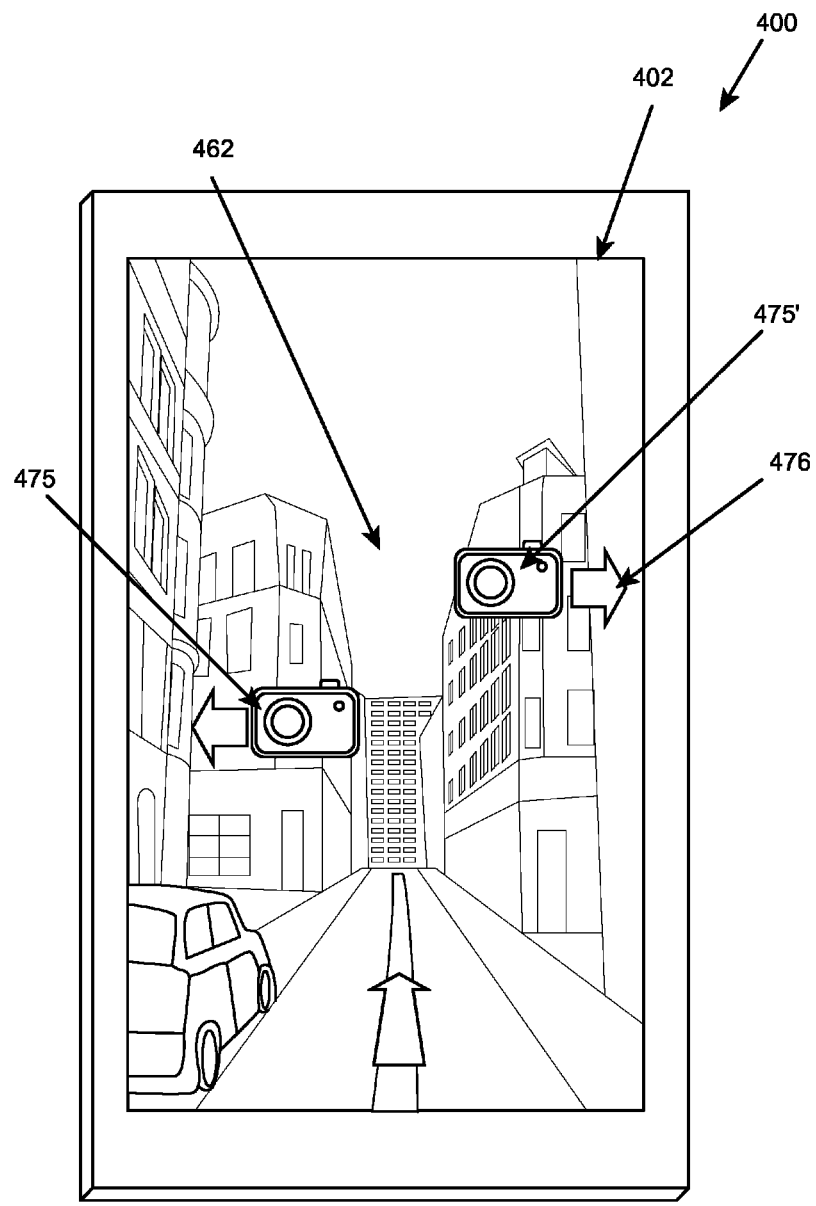
Figure 11:
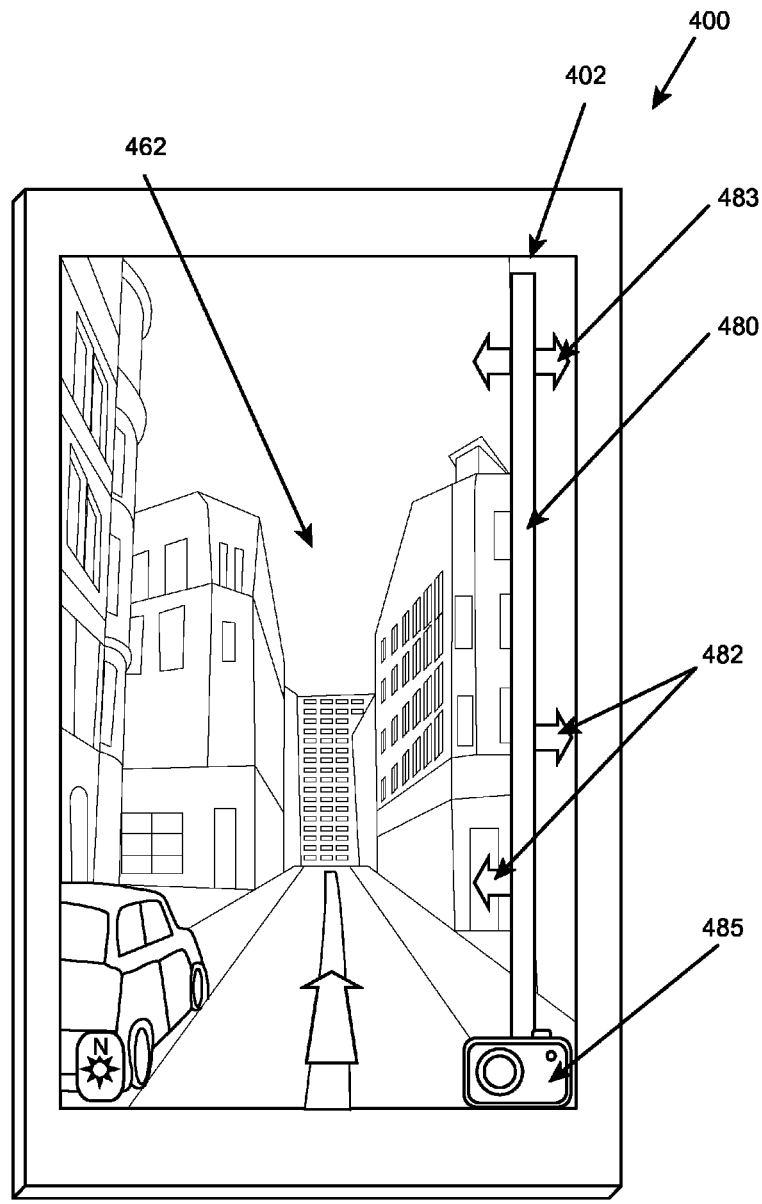
Figure 12:
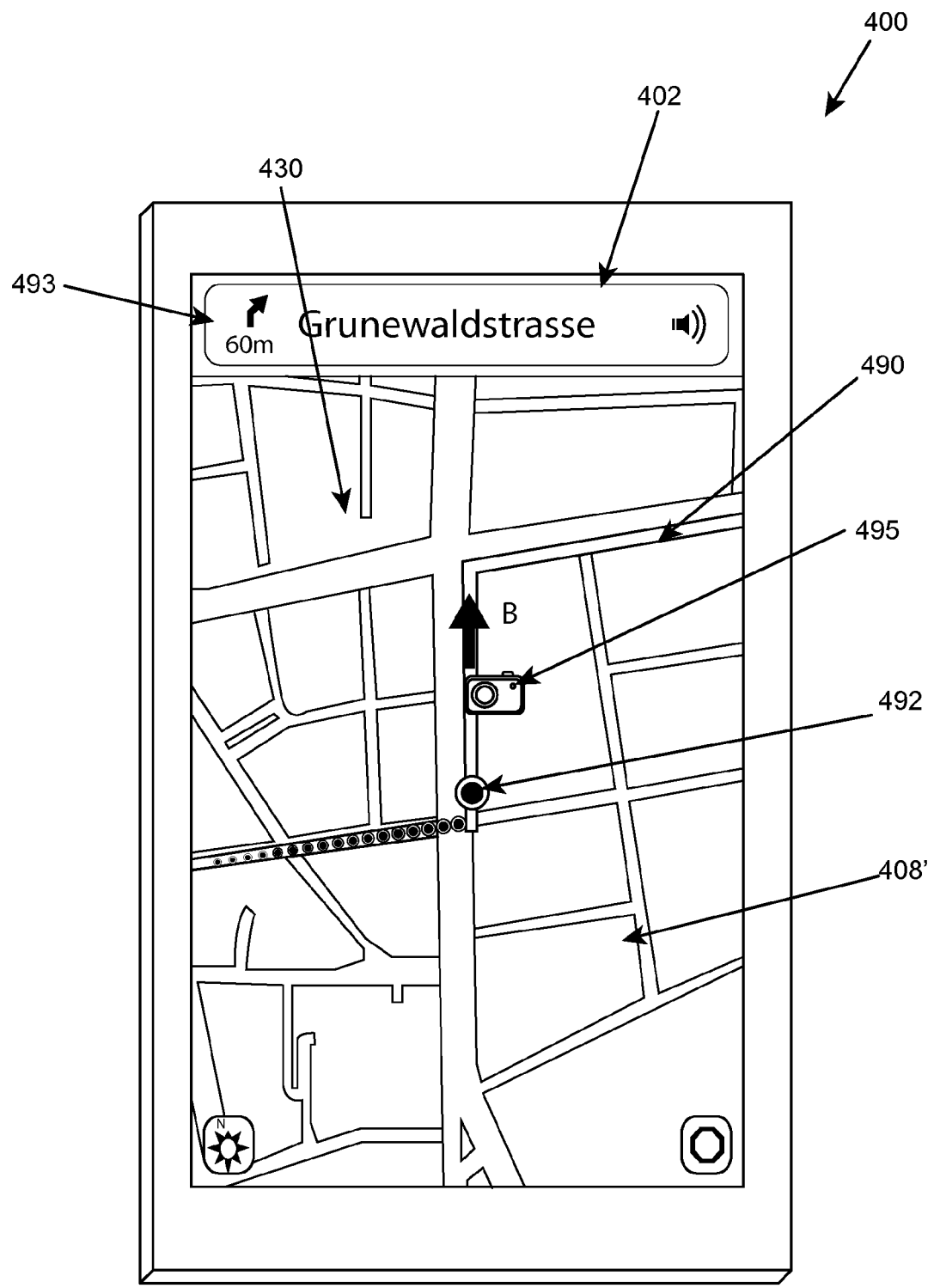
Figure 13:
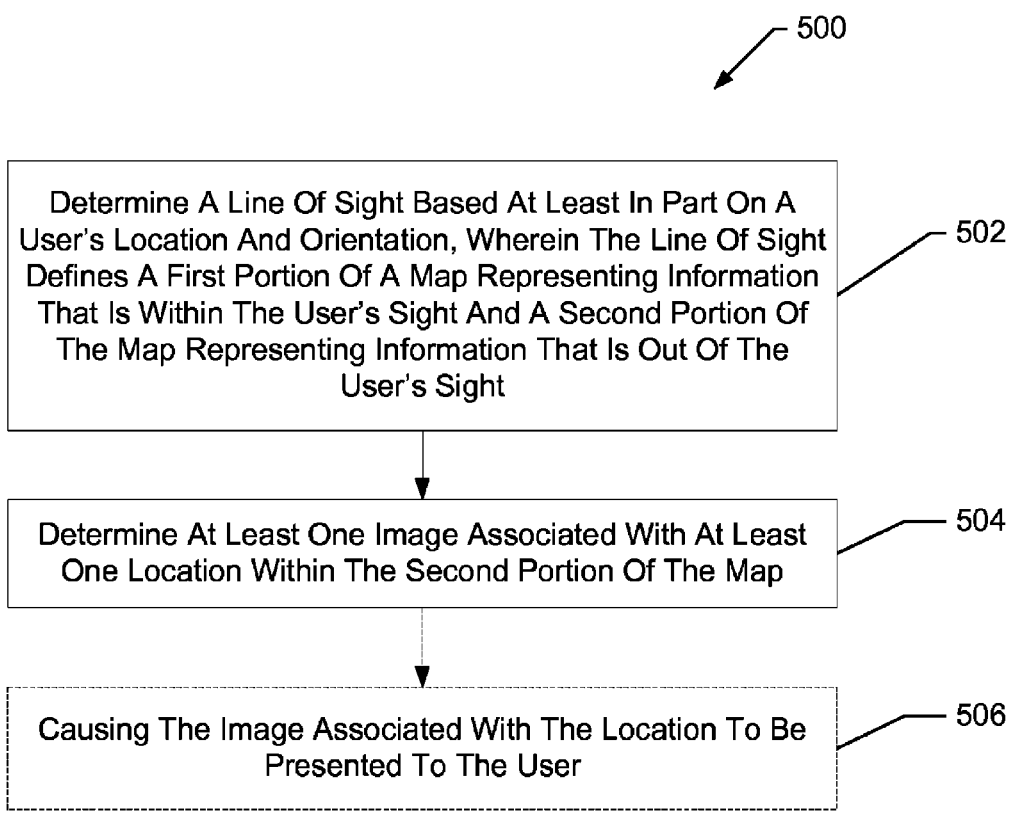
Figure 14:
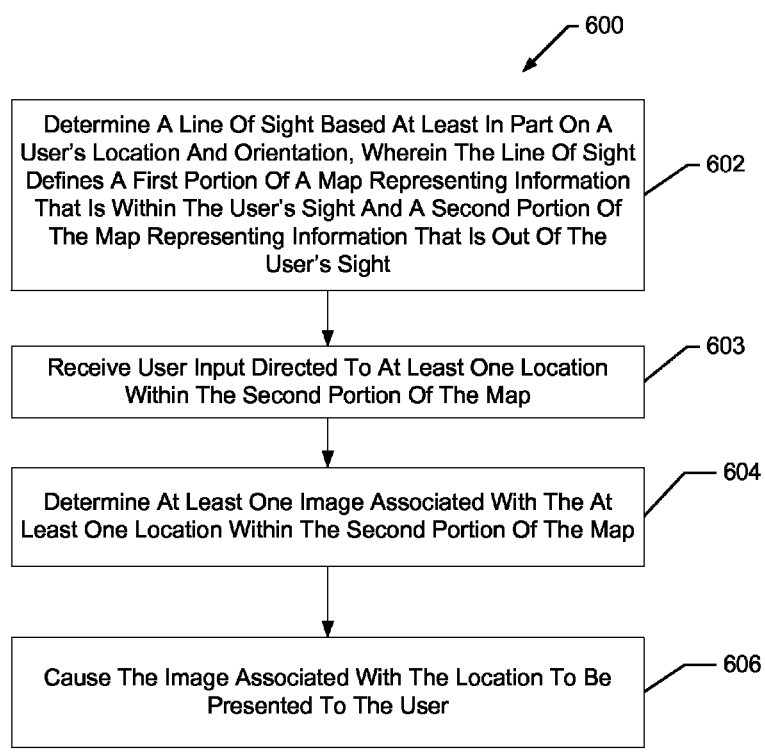

Having thus described some embodiments of the invention in general terms, reference will now be made to the accompanying drawings, which are not necessarily drawn to scale, and wherein:

FIG. 1 illustrates a block diagram of an apparatus according to an example embodiment of the present invention;

FIG. 2 is a schematic block diagram of a mobile terminal according to an example embodiment of the present invention;

FIG. 3 illustrates an example user input of a slide gesture that may be received by an apparatus that may embody, for example, the apparatus shown in FIG. 1, in accordance with an example embodiment of the present invention described herein;

FIG. 4 illustrates an example apparatus, such as the apparatus shown in FIG. 1, with a map being presented on a display, wherein a line of sight of a user is presented, in accordance with an example embodiment of the present invention described herein;

FIG. 5 illustrates an image being presented on the apparatus shown in FIG. 4, wherein the image represents information within a user's sight and corresponds to a first portion of the map shown in FIG. 4, in accordance with an example embodiment of the present invention described herein;

FIG. 6 illustrates an example image being presented on the apparatus shown in FIG. 4, wherein the image is associated with a location within a second portion of the map shown in FIG. 4 that is out of the user's sight, in accordance with an example embodiment of the present invention described herein;

FIG. 7 illustrates another example map being presented on the apparatus shown in FIG. 4, wherein user input is directed to a location on the map, in accordance with an example embodiment of the present invention described herein;

FIG. 8 illustrates an example image being presented on the apparatus shown in FIG. 4, wherein the image is associated with the location in which the user input of FIG. 7 was directed, in accordance with an example embodiment of the present invention described herein;

FIG. 9 illustrates another example map being presented on the apparatus shown in FIG. 4, wherein an icon is being presented relative to a location on the map, in accordance with an example embodiment of the present invention described herein;

FIG. 10 illustrates an image being presented on the apparatus shown in FIG. 4, wherein the image is representative of a view from a location, and wherein icons are presented on the image, in accordance with an example embodiment of the present invention described herein;

FIG. 11 illustrates the image shown in FIG. 10, wherein a slide is presented on the image, in accordance with an example embodiment of the present invention described herein;

FIG. 12 illustrates another example map being presented on the apparatus shown in FIG. 4, wherein a route and an icon are presented on the map, in accordance with an example embodiment of the present invention described herein;

FIG. 13 illustrates a flowchart according to an example method for retrieving views extending a user's line of sight, in accordance with an example embodiment of the present invention described herein; and FIG. 14 illustrates a flowchart according to another example method for retrieving views extending a user's line of sight, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for retrieving views extending a user's line of sight according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, sensor 118, and/or UI control circuitry 122, such as via a bus.

The sensor 118 may be in communication with the processor 110 and/or UI control circuitry 122. In some embodiments, the sensor 118 may be configured to sense and/or detect input. Additionally, in some embodiments, the sensor 118 may be configured to detect or sense the orientation and/or location of the apparatus 102 and/or the user of the apparatus 102. In embodiments wherein the apparatus 102 is embodied as a mobile terminal 10, the sensor 118 may be embodied as or comprise the sensor 18 (shown in FIG. 2). In some embodiments, the processor 110 and/or UI control circuitry 122 may be configured to receive input from the sensor 118 and determine the orientation and/or location of the apparatus 102 and/or the user of the apparatus 102. In some embodiments, the sensor 118 may comprise at least one of a global positioning system (GPS), a pressure sensor, a proximity sensor, a light sensor, an accelerometer, or a gyroscope.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch-screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102 may be configured to receive input on a display (e.g., user interface 116). In some embodiments, such as in an instance when the user interface 116 comprises a touch display, the user input may be in the form of a gesture on or near the display. An example of a gesture is shown in FIG. 3, though other gestures are contemplated by some embodiments of the present invention.

FIG. 3 illustrates an example user input 300 for a touch screen display (e.g., user interface 116). In the depicted embodiment, a user 330 positions their finger 335 on the display to indicate a location (e.g., the user's finger 335 may define a start position). Then, the user 330 may slide their finger 335 in a direction, such as along arrow 338. Such an input may be referred to as a "slide" gesture. In some embodiments, the "slide" gesture may comprise a first user input that includes the indication of a location on the display and a second user input that includes the movement of the user's fingers away from the location.

As noted above, the apparatus 102 may be configured to perform operations. Indeed, in some embodiments, the apparatus 102 may be configured to function as a navigation system that provides geographical and/or travel information for a user, such as provide directions to the user. In some embodiments, the apparatus 102 may be configured to cause calculation of a route in a map. For example, the user may input a starting location and/or a destination. Then, based on available map data (e.g., from a server or local database), the apparatus 102 may be configured to calculate a route between the starting location and the destination. Along these lines, in some embodiments, the apparatus 102 may be configured to cause presentation of the map, such as on the user interface 116. Moreover, in some embodiments, the apparatus 102 may be configured to cause presentation of a calculated route on the map.

Considering the usefulness of the above noted navigation features and the ability of users to carry mobile computing devices (e.g., apparatus 102), users may now rely on their mobile computing devices to get where they need to go. Moreover, such mobile computing devices (e.g., apparatus 102) may be carried with the user and may be used, as noted herein, for additional functions, such as viewing images. In some cases, while using the mobile computing device, the user may wish to view images of locations that may be out of sight. In such a manner, the user may determine if they want to travel to and/or see that location in person.

As such, example embodiments of the present invention seek to provide for retrieving views extending a user's line of sight. The images associated with each view can be presented to the user, often being presented in response to a quick and easy user input.

In such a regard, in some embodiments, the apparatus 102, such as through the processor 110, sensor 118, and/or communication interface 114, may be configured to determine the user's location. For example, in some embodiments, the apparatus 102 may comprise a global positioning system (GPS) (e.g., sensor 118) that is configured to determine the user's location. Additionally or alternatively, the apparatus 102 may be configured to send a signal to a server or other device that may determine the location of the apparatus 102 (and, thus, the user). Though the above description provides some examples of how the apparatus 102 may determine a user's location, some embodiments of the present invention contemplate other ways to determine a user's location.

Additionally, in some embodiments, the apparatus 102, such as through the processor 110, sensor 118, and/or communication interface 114, may be configured to determine a user's orientation. For example, in some embodiments, the apparatus may comprise an accelerometer and/or gyroscope (e.g., sensor 118) that is configured to determine the orientation of the apparatus 102 (and, in some cases, the user). Additionally or alternatively, in some embodiments, other features of the apparatus 102 may be used to help determine the user's orientation. For example, the apparatus 102 may comprises a light sensor (e.g., sensor 118) that may determine the orientation of the apparatus 102 with respect to the user. Then, based on the orientation of the apparatus 102 with respect to the user, the apparatus 102 may determine the user's orientation. Though the above description provides some examples of how the apparatus 102 may determine a user's orientation, some embodiments of the present invention contemplate other ways to determine a user's orientation.

In some embodiments, the apparatus 102, such as through the processor 110, sensor 118, and/or communication interface 114, may be configured to determine the user's sight, such as information that is within the user's sight. In some embodiments, the apparatus 102 may be configured to determine the user's sight based at least in part on the user's location and the user's orientation. For example, the apparatus 102 may be configured to use the user's location and orientation to determine the current location of the user and which way the user is facing. From there, the apparatus 102 may be configured to determine what information (e.g., objects, buildings, roads, landmarks, etc.) is within the user's sight. In some embodiments, the apparatus 102 may determine what information is within the user's sight based in part on a pre-determined sight distance of the user that represents how far the user can see. Additionally, in some embodiments, the pre-determined sight distance may be affected by factors such as age of the user, sight characteristics of the user, time of day, and weather (e.g., fog, rain, etc.).

Additionally, in some embodiments, the apparatus 102, such as through the processor 110, may be configured to determine a first portion of a map representing information that is within the user's sight. For example, based on the user's location and orientation, the apparatus 102 may be configured to determine an area on a map that represents the user's sight. Additionally, in some embodiments, the apparatus 102, such as through the processor 110, may be configured to determine a second portion of a map representing information that is out of the user's sight.

In such a regard, in some embodiments, the apparatus 102, such as through the processor 110, may be configured to determine a line of sight based at least in part on the user's location and orientation. The line of sight may define the first portion of the map representing information that is within the user's sight and the second portion of the map representing information that is out of the user's sight.

Additionally, in some embodiments, the apparatus 102, such as through the processor 110, UI control circuitry 122, and/or user interface 116, may be configured to cause presentation of the line of sight on the map. For example, with reference to FIG. 4, an apparatus 400 (e.g., apparatus 102) may present a map 408 on a display 402. Additionally, the user 410 of the apparatus 400 may be represented. Along these lines, the user's location 412 and orientation 414 (e.g., as represented by the direction of the arrow) may also be presented on the map 408. Based on this information, as described herein, the apparatus 400 the may determine the line of sight that is defined by a first portion of the map representing information that is within the user's sight 420 and a second portion of the map representing information that is out of the user's sight 430. In the depicted embodiment, the first portion 420 is highlighted on the map 408. Indeed, with reference to FIG. 5, the first portion 420 may be representative of information the user can actually see (e.g., the image 422 represents the user's sight).

Along these lines, in some embodiments, the apparatus 102, such as through the processor 110, may be configured to determine the user's sight based on at least one object within the user's sight. Along these lines, in some embodiments, the apparatus 102 may be configured to determine the user's sight based on a three-dimensional model of information within the user's sight. For example, the apparatus 102 may be configured to determine the user's sight based on a three-dimensional model of a portion of a city that is within the user's sight. Such a three-dimensional model may be pre-stored or accessed, such as via a server. In such a manner, objects that are within the user's sight and affect the user's sight (such as a large building that blocks a portion of the user's sight) may be accounted for. For example, with reference to FIG. 5, a large building 427 may block part of the user's sight. As such, with reference to FIG. 4, the line of sight as represented in the first portion 420 may be modified to account for the large building 427. Though the above description details that a large building may block the user's sight, some embodiments of the present invention contemplate that other objects (e.g., statues, mountains, trees, etc.) may block the user's sight and, thus, may modify the first portion of the map according to those objects.

As noted herein, a user may wish to easily and quickly view images of locations that are currently not visible to the user. In such a regard, in some embodiments, the apparatus 102, such as through the processor 110, may be configured to determine at least one image associated with at least one location within the second portion of the map. In such embodiments, the apparatus 102 may determine (e.g., retrieve) images that represent information that is out of the user's sight. In some embodiments, the apparatus 102 may be configured to retrieve these images from a server, such as a cloud.

With reference to FIG. 4, examples of possible locations for images associated with the second portion of the map 430 are represented as views 435. Such views may be associated with images that represent what the user would see if the user was in that location and oriented accordingly.

In some embodiments, the apparatus 102, such as through the processor 110, the UI control circuitry 122, and/or the user interface 116, may be configured to cause the image associated with the location to be presented to the user. For example, with reference to FIG. 4, area 436 represents a possible view down a street called "Rue Saint-Marc" 437. With reference to FIG. 6, the apparatus 400 may cause an image 440 of the street "Rue Saint-Marc" 437 to be presented to the user on the display 402. In such a manner, the user may quickly see an image of "Rue Saint-Marc" 437 and determine if they want to travel to that street.

In some embodiments, the apparatus 102, such as through the user interface 116, UI control circuitry 122, and/or sensor 118, may be configured to receive user input directed to the at least one location within the second portion of the map. Additionally, in some embodiments, in response to receiving the user input, the apparatus 102, such as through the user interface 116, may be configured to cause the image associated with the at least one location to be presented to the user. For example, with reference to FIG. 7, the user 450 may position their finger 455 on a location 438 on the map 408 within the second portion 430. Then, the user 450 may slide their finger 455 in a direction, such as along arrow A (e.g., down the street "Rue Saint-Marc" 437). In such a manner, the user 450 may perform a slide gesture. Then, in response to receiving the user input, with reference to FIG. 8, the apparatus 400 may cause the image 440 of the street "Rue Saint-Marc" 437 to be presented to the user on the display 402. In such a manner, the user may provide user input and quickly see an image of "Rue Saint-Marc" 437 and determine if they want to travel to that street.

In some embodiments, the apparatus 102, such as through the processor 110, may be configured to determine the at least one image based on the location indicated and the direction of the user input. For example, with reference to FIG. 7, the apparatus 400 may recognize that the user 450 performed a slide gesture down the street "Rue Saint-Marc" 437 that originated at location 438 and, accordingly, determine the image 440 (shown in FIG. 8) showing a view of the street "Rue Saint-Marc" 437 from that location 438. Though the above described embodiment details a slide gesture as an example user input, some embodiments of the present invention contemplate other user inputs (e.g., point gesture, swipe gesture, reverse pinch gesture, etc.).

In some embodiments, the apparatus 102, such as through the processor 110, user interface 116, and/or UI control circuitry 122, may be configured to cause presentation of an icon on the map relative to the location within the second portion of the map. For example, with reference to FIG. 9, the apparatus 400 may present an icon 450 (e.g., a camera) relative to a location 438. The icon, in some embodiments, may represent a possible image that is available for presentation to the user.

Additionally, in some embodiments, the apparatus 102, such as through the user interface 116, UI control circuitry 122, and/or sensor 118, may be configured to receive user input directed to the icon. Then, in some embodiments, the apparatus 102, such as through the processor 110, may be configured to, in response to receiving the user input directed to the icon, cause the image associated with the location to be presented to the user. For example, a user may provide user input (e.g., a point gesture) directed to the icon 450. Then, in response to receiving the user input, with reference to FIG. 8, the apparatus 400 may cause the image 440 of the street "Rue Saint-Marc" 437 to be presented to the user on the display 402.

Additionally, in some embodiments, the apparatus 102, such as through the processor 110, user interface 116, and/or UI control circuitry 122, may be configured to cause presentation of an image representing information currently within the user's sight (e.g., the current user line of sight). Alternatively, in some embodiments, the image may represent a view that is not currently visible to the user (such as may be presented in response to receiving user input directed to a location, such as described above). Additionally, in some embodiments, the apparatus 102, such as through the processor 110, user interface 116, and/or UI control circuitry 122, may be configured to cause presentation of at least one icon on the image, wherein the icon represents a location within the second portion of the map that is out of the user's sight and a corresponding second image associated with that location. In such a manner, the user may provide user input to the icon on the image to view the second image. For example, with reference to FIG. 10, the apparatus 400 may present an image 462 of a street. Additionally, the apparatus 400 may present a first icon 475 that represents a second location (and corresponding second image) and a second icon 475' that represents a third location (and corresponding third image). Thus, if the user desires to view the second image, they can provide user input to the first icon 475. Likewise, if the user desires to view the third image, they can provide user input to the second icon 475'. Additionally, in some embodiments, the apparatus 400 may present an arrow 476 that provides an additional indication as to the available image for the user (e.g., a direction that the third image extends along).

Moreover, in some embodiments, the apparatus 102 may be configured to cause more than one icon to be presented at different positions on the image (and with respect to each other) to provide further information. For example, as shown in FIG. 10, the second icon 475' is positioned higher on the display 402 than the first icon 475 to represent that the third image is further away from the user than the second image.

In some embodiments, the apparatus 102, such as through the processor 110, user interface 116, and/or UI control circuitry 122, may be configured to cause presentation of a slide on an image presented to the user. Additionally, a portion of the slide may be associated with the at least one location within the second portion of the map. In such a regard, portions of the slide may be associated with available images. For example, with reference to FIG. 11, the apparatus 400 may present a slide 480 along an image 462 that shows a view down a street. Additionally, an icon 485 (e.g., camera icon) may be presented on the slide 480. Moreover, the slide 480 may include a plurality of arrows 482 that represent available locations and corresponding images for presentation to the user.

In some embodiments, the slide may be presented with additional features. In some cases, the additional features may provide indications to the user. For example, in some embodiments, the slide may extend along the user's sight on the map such that the end of the slide corresponds to the end of the user's sight. For example, with reference to FIG. 11, the slide 480 extends to the top of the display 402, which may correspond to the edge of the user's current sight (e.g., how far the user can see down the street in the image 462).

As such, in some embodiments, the apparatus 102, such as through the processor 110, user interface 116, and/or UI control circuitry 122, may be configured to receive user input directed to at least a portion of the slide and, in response to receiving the user input, cause the image associated with the location to be presented to the user. For example, with reference to FIG. 11, a user may provide user input to the icon 485 and "translate" the icon 485 along the slide 480 until it reaches an arrow (e.g., arrow 483). As used herein, an icon can "translate" on the display, for example, by moving with a user's finger across the display. Additionally, in some embodiments, the user may further "translate" the icon 485 to the right (e.g., along arrow 483) to indicate that the user desires to see the image associated with that location (and orientation). In response, the apparatus 400, may present the associated image.

Likewise, in some embodiments, the apparatus 102, such as through the processor 110, user interface 116, and/or UI control circuitry 122, may be configured to cause presentation of a slide relative to a first portion of the map. Additionally, a portion of the slide may be associated with the at least one location within the second portion of the map. In such a regard, portions of the slide may be associated with available images. For example, a slide may be presented proximate a first portion of the map and configured to enable a user to provide user input to portions of the slide to cause images. Then, in response to the user input, the image associated with the corresponding portion of the slide may be presented to the user.

In some embodiments, the apparatus 102, such as through the processor 110, user interface 116, and/or UI control circuitry 122, may be configured to cause presentation of a route on a map. In some cases, the route may correspond to a navigational route for the user to follow for directions between, for example, a starting point and a destination. In some embodiments, at least a portion of the route may be associated with the location within the second portion of the map representing information out of the user's sight. In such a regard, at least a portion of the route may correspond to a location with an available image for presentation to a user.

In some embodiments, the apparatus 102, such as through the processor 110, user interface 116, and/or UI control circuitry 122, may be configured to cause presentation of an icon on the portion of the route associated with the location. In such a regard, the icon may represent an available image that may be presented to the user. Additionally, the apparatus 102, such as through the processor 110, user interface 116, and/or UI control circuitry 122, may be configured to receive user input directed to the icon and, in response, cause the image associated with the location to be presented to the user. For example, with reference to FIG. 12, the apparatus 400 may present a map 408' on a display 402. Additionally, a route 490 may be presented along the map 408'. In some cases, the current location of the user 492 may also be presented (e.g., represented by the green circle). Further, in some embodiments, the apparatus 400 may present other information useful for navigation, such as information 493 regarding an upcoming turn. An icon 495 may also be presented on a portion of the route 490 associated with a location that has an associated image. In such an embodiment, the user may provide user input to the icon 495 to cause the image associated with the location along the route to be presented.

Additionally, in some embodiments, the icon may be configured to "translate" along the route. In such an embodiment, the apparatus 102, such as through the processor 110, user interface 116, and/or UI control circuitry 122, may be configured to receive user input defining a slide gesture with the icon extending from the portion of the route. Thus, the slide gesture may define the location (and, in some cases, the orientation) and, thus, the associated image may be presented to the user. For example, with reference to FIG. 12, the icon 495 may be configured to "translate" along the route 490 such that the user may determine the location in which an associated image is desired to be presented.

Embodiments of the present invention provide methods, apparatus and computer program products for retrieving views extending a user's line of sight. Various examples of the operations performed in accordance with embodiments of the present invention will now be provided with reference to FIGS. 13-14.

FIG. 13 illustrates a flowchart according to an example method for retrieving views extending a user's line of sight according to an example embodiment 500. The operations illustrated in and described with respect to FIG. 13 may, for example, be performed by, with the assistance of, and/or under the control of one or more of the processor 110, memory 112, communication interface 114, sensor 118, user interface 116, or UI control circuitry 122. Operation 502 may comprise determining a line of sight based at least in part on a user's location and orientation, wherein the line of sight defines a first portion of a map representing information that is within the user's sight and a second portion of the map representing information that is out of the user's sight. The processor 110, communication interface 114, and/or sensor 118, may, for example, provide means for performing operation 502. Operation 504 may comprise determining at least one image associated with at least one location within the second portion of the map. The processor 110 and/or communication interface 114 may, for example, provide means for performing operation 504. In some embodiments, operation 506 may comprise causing the image associated with the location to be presented to the user. The processor 110, user interface 116, and/or UI control circuitry 122, may, for example, provide means for performing operation 506.

FIG. 14 illustrates a flowchart according to another example method for retrieving views extending a user's line of sight according to an example embodiment 600. The operations illustrated in and described with respect to FIG. 14 may, for example, be performed by, with the assistance of, and/or under the control of one or more of the processor 110, memory 112, communication interface 114, sensor 118, user interface 116, or UI control circuitry 122. Operation 602 may comprise determining a line of sight based at least in part on a user's location and orientation, wherein the line of sight defines a first portion of a map representing information that is within the user's sight and a second portion of the map representing information that is out of the user's sight. The processor 110, communication interface 114, and/or sensor 118, may, for example, provide means for performing operation 602. Operation 603 may comprise receiving user input directed to at least one location within the second portion of the map. The processor 110, user interface 116, and/or UI control circuitry 122, may, for example, provide means for performing operation 603. Operation 604 may comprise determining at least one image associated with the at least one location within the second portion of the map. The processor 110 and/or communication interface 114 may, for example, provide means for performing operation 604. Operation 606 may comprise causing the image associated with the location to be presented to the user. The processor 110, user interface 116, and/or UI control circuitry 122, may, for example, provide means for performing operation 606.

FIGS. 13-14 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
determining, by a processor, a line of sight based at least in part on a user's location and orientation, wherein the line of sight defines a first portion of a map representing information that is within the user's sight and a second portion of the map representing information that is out of the user's sight and associated with at least one potential view of the user if the user were at a different location within the first portion of the map;
determining at least one image associated with at least one location within the second portion of the map;
receiving user input directed to the at least one location within the second portion of the map; and
causing, in response to receiving the user input, the at least one image associated with the at least one location to be presented to the user.

2. The method according to claim 1, wherein receiving user input directed to the at least one location within the second portion of the map comprises receiving user input comprising a slide gesture.

3. The method according to claim 1 further comprising causing presentation of the line of sight on the map.

4. The method according to claim 3 further comprising receiving user input directed to the at least one location within the second portion of the map and, in response to receiving the user input, causing the image associated with the location to be presented to the user.

5. The method according to claim 3 further comprising causing presentation of an icon relative to the location within the second portion of the map.

6. The method according to claim 5 further comprising receiving user input directed to the icon and, in response to receiving the user input, causing the image associated with the location to be presented to the user.

7. The method according to claim 3 further comprising causing presentation of a slide relative to the first portion of the map, wherein a portion of the slide is associated with the at least one location within the second portion of the map.

8. The method according to claim 7 further comprising receiving user input directed to at least a portion of the slide and, in response to receiving the user input, causing the image associated with the location to be presented to the user.

9. The method according to claim 1, wherein determining the line of sight comprises determining the line of sight based at least in part on an object within the user's sight.

10. The method according to claim 1 further comprising causing presentation of a route on the map, wherein at least a portion of the route is associated with the location within the second portion of the map, and causing presentation of an icon on the portion of the route associated with the location.

11. The method according to claim 10 further comprising receiving user input directed to the icon and, in response to receiving the user input, causing the image associated with the location to be presented to the user.

12. The method according to claim 11, wherein the icon is configured to slide along the route, wherein receiving user input comprises receiving user input defining a slide gesture with the icon extending from the portion of the route.

13. The method of claim 1, further comprising determining the user's location and orientation.

14. An apparatus comprising a processor and a memory including computer program code, the memory and the computer program code configured to, with the processor, cause the apparatus to:
determine a line of sight based at least in part on a user's location and orientation, wherein the line of sight defines a first portion of a map representing information that is within the user's sight and a second portion of the map representing information that is out of the user's sight and associated with at least one potential view of the user if the user were at a different location within the first portion of the map;
determine at least one image associated with at least one location within the second portion of the map;
receive user input directed to the at least one location within the second portion of the map; and
cause, in response to receiving the user input, the at least one image associated with the at least one location to be presented to the user.

15. The apparatus of claim 14, wherein the memory and the computer program code are further configured to, with the processor, cause the apparatus to receive user input directed to the at least one location within the second portion of the map by receiving user input comprising a slide gesture.

16. The apparatus of claim 14, wherein the memory and the computer program code are further configured to, with the processor, cause the apparatus to determine the user's location and orientation.

17. Computer program product comprising a non-transitory computer readable medium having program code portions stored thereon, the program code portions being a computer readable medium and configured when said program product is run on a computer or network device, to:
determine a line of sight based at least in part on a user's location and orientation, wherein the line of sight defines a first portion of a map representing information that is within the user's sight and a second portion of the map representing information that is out of the user's sight and associated with at least one potential view of the user if the user were at a different location within the first portion of the map;
determine at least one image associated with at least one location within the second portion of the map;
receive user input directed to the at least one location within the second portion of the map; and
cause, in response to receiving the user input, the at least one image associated with the at least one location to be presented to the user.

18. The computer program product of claim 17, wherein the program code portions are further configured, when said program product is run on a computer or network device, to determine the user's location and orientation.

* * * * *